United States Patent
Suthiwangcharoen et al.

(10) Patent No.: US 11,028,233 B2
(45) Date of Patent: Jun. 8, 2021

(54) METHOD FOR MAKING AN AMINO-FUNCTIONAL POLYDIORGANOSILOXANE USING A REMOVABLE SOLID CATALYST

(71) Applicant: Dow Silicones Corporation, Midland, MI (US)

(72) Inventors: Nisaraporn Suthiwangcharoen, Midland, MI (US); Kimmai Nguyen, Midland, MI (US); Hannah Wedge, Midland, MI (US)

(73) Assignee: Dow Silicones Corporation, Midland, MI (US)

(*) Notice: Subject to any disclaimer, the term of this patent is extended or adjusted under 35 U.S.C. 154(b) by 0 days.

(21) Appl. No.: 16/652,699

(22) PCT Filed: Apr. 3, 2019

(86) PCT No.: PCT/US2019/025498
§ 371 (c)(1),
(2) Date: Apr. 1, 2020

(87) PCT Pub. No.: WO2019/231558
PCT Pub. Date: Dec. 5, 2019

(65) Prior Publication Data
US 2021/0070946 A1  Mar. 11, 2021

Related U.S. Application Data

(60) Provisional application No. 62/678,430, filed on May 31, 2018.

(51) Int. Cl.
C08G 77/08 (2006.01)
C08G 77/388 (2006.01)
C08G 77/16 (2006.01)
C08K 5/544 (2006.01)
C08L 83/08 (2006.01)

(52) U.S. Cl.
CPC .......... *C08G 77/388* (2013.01); *C08G 77/08* (2013.01); *C08G 77/16* (2013.01); *C08K 5/544* (2013.01); *C08L 83/08* (2013.01)

(58) Field of Classification Search
None
See application file for complete search history.

(56) References Cited

U.S. PATENT DOCUMENTS

| | | | |
|---|---|---|---|
| 4,523,002 A | 6/1985 | Campbell et al. | |
| 4,539,379 A | 9/1985 | Hallgren | |
| 4,633,002 A * | 12/1986 | Piskoti ............ | C08G 77/26 106/38.22 |
| 4,978,363 A * | 12/1990 | Ona ............... | D06M 13/184 252/8.81 |
| 5,164,522 A | 11/1992 | McCarthy et al. | |
| 5,302,671 A * | 4/1994 | Cifuentes ......... | C09D 183/08 525/477 |
| 5,352,817 A | 10/1994 | McCarthy et al. | |
| 5,391,675 A * | 2/1995 | Cray ............... | C08G 77/08 528/14 |
| 5,461,134 A | 10/1995 | Leir et al. | |
| 5,777,144 A | 7/1998 | Rubinsztajn et al. | |
| 5,824,814 A | 10/1998 | Cray et al. | |
| 6,255,429 B1 * | 7/2001 | Griffin ............. | C08L 83/08 528/25 |
| 6,472,468 B1 * | 10/2002 | Omura ............. | C08G 77/24 442/81 |
| 6,515,095 B1 * | 2/2003 | Omura ............. | C08G 77/26 528/38 |
| 7,238,768 B2 | 7/2007 | Hupfield et al. | |
| 7,781,505 B2 | 8/2010 | Cook et al. | |
| 8,455,603 B2 | 6/2013 | Ferenz et al. | |
| 8,557,944 B2 * | 10/2013 | Henning ........... | C08L 83/08 528/38 |
| 9,085,704 B2 * | 7/2015 | Liu ................ | D06M 13/513 |
| 9,273,072 B2 | 3/2016 | Fritz-Langhals | |
| 10,336,866 B2 * | 7/2019 | Fritz-Langhals ... | C08G 77/26 |
| 2005/0215806 A1 * | 9/2005 | Heller ............. | C08G 77/26 556/413 |
| 2011/0230633 A1 | 9/2011 | Ferenz et al. | |
| 2013/0259821 A1 | 10/2013 | Henning et al. | |

FOREIGN PATENT DOCUMENTS

EP  1580215  9/2005

OTHER PUBLICATIONS

Search report from corresponding Japan 2020-517458 application, dated Sep. 8, 2020.

* cited by examiner

*Primary Examiner* — Robert S Loewe
(74) *Attorney, Agent, or Firm* — Catherine U. Brown

(57) ABSTRACT

A method for preparing an amino-functional polydiorganosiloxane employs a removable catalyst. The method differs from previous methods in the selection of catalyst, order of addition of catalyst with respect to other starting materials, and catalyst removal.

18 Claims, No Drawings

METHOD FOR MAKING AN AMINO-FUNCTIONAL POLYDIORGANOSILOXANE USING A REMOVABLE SOLID CATALYST

CROSS REFERENCE TO RELATED APPLICATIONS

This application is a U.S. national stage filing under 35 U.S.C. § 371 of PCT Application No. PCT/US2019/025498 filed on Apr. 3, 2019, which claims the benefit of U.S. Provisional Patent Application No. 62/678,430 filed May 31, 2018 under 35 U.S.C. § 119 (e). PCT Application No. PCT/US2019/025498 and U.S. Provisional Patent Application No. 62/678,430 are hereby incorporated by reference.

TECHNICAL FIELD

This invention relates to a method for making an amino-functional polydiorganosiloxane via condensation reaction. More specifically, the method for making the amino-functional polydiorganosiloxane employs a removable catalyst.

INTRODUCTION

Amino-functional polydiorganosiloxanes are useful as conditioners in hair care applications or as softeners in textile applications. The amino groups can be either attached to terminal silicon atoms of a polydiorganosiloxane or as pendant groups attached to silicon atoms randomly distributed within the backbone of siloxane chains.

Problem to be Solved

Carboxylic acid catalyzed condensation reaction has been used to produce amino-functional polydiorganosiloxanes. However, in known processes, the carboxylic acid or carboxylate salt thereof, or both, remains as a "living catalyst" in the polyorganosiloxane throughout its shelf-life, and this may have deleterious effects on stability.

SUMMARY

A method for preparing an amino-functional polydiorganosiloxane comprises:
1) mixing and heating, at a temperature of 50° C. to 160° C., starting materials comprising
   A) a silanol functional polydiorganosiloxane,
   B) an aminoalkyl-functional alkoxysilane,
   where amounts of starting materials A) and B) are such that a molar excess of silanol groups with respect to alkoxy groups is present; and
2) providing starting material D) a catalyst, thereby forming a reaction mixture;
3) mixing and heating the reaction mixture to form the reaction product; and
4) reducing amount of residual acid to 0 to <500 ppm, based on the weight of the amino-functional polydiorganosiloxane.

DETAILED DESCRIPTION

The method for preparing the amino-functional polydiorganosiloxane comprises:
1) mixing and heating, at a temperature of 50° C. to 160° C., starting materials comprising
   A) a silanol functional polydiorganosiloxane,
   B) an aminoalkyl-functional alkoxysilane,
   where amounts of starting materials A) and B) are such that a molar excess of silanol groups with respect to alkoxy groups is present, and
   C) 0 to 0.5%, based on combined weights of all starting materials, of an endblocker; and thereafter
2) providing starting material D) 0.01% to 5%, based on weight of starting material B), of catalyst, thereby forming a reaction mixture;
3) mixing and heating the reaction mixture at a temperature sufficient to form the reaction product; and
4) removing all or a portion of residual acid, thereby reducing amount of residual acid in the reaction product to 0 to <500 ppm, based on the weight of the amino-functional polydiorganosiloxane.

Step 1)

Mixing and heating may be performed using any convenient means, such as loading the starting materials into an agitated, jacketed batch reactor or reactive distillation apparatus having a jacketed vessel, which can be heated and cooled by passing steam/water or heat transfer fluid through the jacket. Step 1) may be performed at a temperature of at least 50° C., alternatively at least 85° C., and alternatively at least 90° C. Alternatively, heating in step 1) may be performed at 50° C. to 150° C., alternatively 85° C. to 150° C., and alternatively 90° C. to 150° C.

A) Silanol Functional Polydiorganosiloxane

Starting material A) is a silanol functional polydiorganosiloxane. Starting material A) comprises unit formula (I): $(R^1_3SiO_{1/2})_a(R^1_2SiO_{1/2})_b(HOR^1SiO_{2/2})_c(HOR^1_2SiO_{1/2})_d$, where each $R^1$ is independently selected from a monovalent hydrocarbon group and a monovalent halogenated hydrocarbon group, as defined below; and the subscripts have values such that: $2 \geq a \geq 0$, $4000 \geq b \geq 0$, $4000 \geq c \geq 0$, and $2 \geq d \geq 0$, with the provisos that a quantity $(a+d)=2$, a quantity $(c+d) \geq 2$, and a quantity $4 \leq (a+b+c+d) \leq 8000$. Alternatively, $4 \leq (a+b+c+d) \leq 4000$. Alternatively, $10 \leq (a+b+c+d) \leq 100$. Alternatively, subscripts a to d may have values sufficient to provide the silanol functional polydiorganosiloxane with a viscosity of 10 to 100 cP, alternatively 30 to 70 cP. Alternatively, each $R^1$ may be selected from alkyl and aryl. Alternatively, each $R^1$ may be selected from methyl and phenyl. Alternatively, at least 80% of all $R^1$ groups are methyl. Alternatively, each $R^1$ is methyl. Alternatively, starting material A) may comprise an a,w-silanol endblocked polydiorganosiloxane of formula (II): $HOR^1_2SiO-(R^1_2SiO)_e-SiR^1_2OH$, where $R^1$ is as described above and subscript e has a value sufficient to provide the polydiorganosiloxane with a viscosity of 10 to 100 cP, alternatively 30 to 70 cP. Alternatively, subscript e has a value such that $4 \leq e \leq 1000$. Alternatively, $10 \leq e \leq 100$. Examples of suitable silanol functional polydiorganosiloxanes for starting material A) are exemplified by A1) a silanol end-blocked polydimethylsiloxane with a viscosity of 30 cP to 70 cP, A2) a silanol end-blocked polydimethylsiloxane with a degree of polymerization of 4 to 1000, or both A1) and A2). Silanol-terminated polydiorganosiloxanes suitable for use as starting material A) may be prepared by methods known in the art, such as hydrolysis and condensation of the corresponding organohalosilanes or equilibration of cyclic polydiorganosiloxanes.

The amount of starting material A) is sufficient that a molar ratio of silanol groups on starting material A) to Si-bonded alkoxy groups of starting material B) is greater than 1:1. Without wishing to be bound by theory, it is thought this will ensure that chain extension polymerization takes place, rather than merely capping of the silanol groups by the aminoalkyl-functional alkoxysilane B). Alternatively, the molar ratio of silanol groups of starting material A) to Si-bonded alkoxy groups of starting material B) may range from 1.2:1 to 2:1.

B) Aminoalkyl-Functional Alkoxysilane

Starting material B) contains an aminoalkyl group and an alkoxy group bonded to Si. The aminoalkyl group may have formula (III): R—(NH-A')$_q$—NH-A- wherein A and A' are each independently a linear or branched alkylene group having 1 to 6 carbon atoms and optionally containing an ether linkage; subscript q is 0 to 4; R is hydrogen, an alkyl group, or a hydroxyalkyl group having 1 to 4 carbon atoms. Alternatively, R may be hydrogen; q may be 0 or 1; and A and A'(if present) each contain 2 to 4 carbon atoms. Examples of suitable aminoalkyl groups include —(CH$_2$)$_3$NH$_2$, —(CH$_2$)$_4$NH$_2$, —(CH$_2$)$_3$NH(CH$_2$)$_2$NH$_2$, —CH$_2$CH(CH$_3$)CH$_2$NH(CH$_2$)$_2$NH$_2$, —(CH$_2$)$_3$NHCH$_2$CH$_2$NH(CH$_2$)$_2$NH$_2$, —CH$_2$CH(CH$_3$)CH$_2$NH(CH$_2$)3NH$_2$, —(CH$_2$)$_3$NH(CH$_2$)$_4$NH$_2$, and —(CH$_2$)$_3$O(CH$_2$)$_2$NH$_2$. The alkoxy group bonded to Si can contain an unreactive substituent or linkage such as an ether linkage. The aminoalkyl-functional alkoxysilane may have formula (IV):

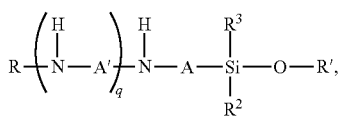

where A, A', R, and subscript q are as defined above; R' is an alkyl group or an alkoxyalkyl group having 1 to 6 carbon atoms, for example, methyl, ethyl, butyl or methoxyethyl; and R$^2$ and R$^3$ are each independently a group —OR' or an optionally substituted alkyl or aryl group. Alternatively, for the preparation of linear polydiorganosiloxanes, the group R$^2$ may be an alkyl group such as methyl and the group R$^3$ may have the formula —OR', such as methoxy or ethoxy. Examples of aminoalkyl-functional alkoxysilanes suitable for starting material B) include B1) 3-aminopropylmethyl dimethoxysilane, B2) 3-aminopropylmethyl diethoxysilane, B3) aminoethyl-aminoisobutyl methyl dimethoxy silane, B4) aminoethyl-aminoisobutyl methyl diethoxysilane, B5) 3-aminopropyldimethyl ethoxysilane, B6) 3-aminopropyldimethyl methoxysilane, B7) 3-(2-aminoethylamino)propyl-dimethoxymethylsilane, B8) 3-(2-aminoethylamino)propyl-diethoxymethylsilane, B9) aminopropyl methyl dimethoxy silane, B10) aminopropyl methyl diethoxysilane, and B11) a combination of two or more of B1) to B10). In one embodiment, the aminoalkyl-functional alkoxysilane comprises a monoalkoxysilane, such as B5) 3-aminopropyldimethyl ethoxysilane or B6) 3-aminopropyldimethyl methoxysilane, and the amino-functional polydiorganosiloxane has amino-functional end capping therefrom. Alternatively, the starting materials may comprise a separate endblocker.

C) Endblocker

Starting material C) is an endblocker that may optionally be added to the starting materials in the method described herein. The endblocker may be used to cap some of the silanol groups on starting material A), for example, when the amino-functional polydiorganosiloxane will have pendant amino-functional groups and/or when a trihydrocarbylsilyl-terminated (e.g., trialkyl-silyl terminated, such as trimethylsilyl-terminated) amino-functional polydiorganosiloxane will be produced by the method. The endblocker is capable of reacting with a silanol group and generating an endblocking triorganosilyl unit where the triorganosilyl functionality is unreactive with the silanol groups of starting material A). Suitable endblockers are exemplified by C1) a monoalkoxysilane, C2) a silazane, or C3) both C1) and C2).

The monoalkoxysilane may have formula (V): R$^4_3$SiOR$^5$, where each R$^4$ is independently a monovalent organic group unreactive with silanol functionality and each R$^5$ is a monovalent hydrocarbon group of 1 to 6 carbon atoms. Alternatively, R$^5$ may be an alkyl group of 1 to 6 carbon atoms, alternatively 1 to 4 carbon atoms, alternatively 1 to 2 carbon atoms, and alternatively R$^5$ may be methyl. Each R$^4$ may be a monovalent hydrocarbon group selected from alkyl, alkenyl, and aryl groups. Alternatively, each R$^4$ may be an alkyl group of 1 to 6 carbon atoms, an alkenyl group of 2 to 6 carbon atoms or a phenyl group. Alternatively, each R$^4$ may be an alkyl group of 1 to 6 carbon atoms, alternatively 1 to 4 carbon atoms, and alternatively each R$^4$ may be methyl. Examples of monoalkoxysilanes for starting material C1) include C4) trimethylmethoxysilane and C5) trimethylethoxysilane.

Suitable silazanes may have formula (VI): (R$^6$R$^7_2$Si)$_2$NH, where each R$^6$ is independently selected from a monovalent hydrocarbon group and a monovalent halogenated hydrocarbon group (as described herein for R$^1$), each R$^7$ is an independently selected monovalent hydrocarbon group of 1 to 6 carbon atoms, as described above for R$^5$. Each R$^6$ may be an alkyl group, an alkenyl group, or a halogenated alkyl group. Suitable alkyl groups for R$^6$ include methyl, ethyl, propyl, and butyl. Suitable alkenyl groups include vinyl and allyl. Suitable halogenated alkyl groups include trifluoropropyl. Examples of suitable silazanes for starting material C2) include C6) hexamethyldisilazane, C7) sym-tetramethyldivinyldisilazane, and C8) [(CF$_3$CH$_2$CH$_2$)(CH$_3$)$_2$Si]$_2$NH.

The endblocker is optional, and the exact amount depends on various factors including the desired DP of the amino-functional polydiorganosiloxane to be formed. However, the endblocker may be added in an amount up to 5%, alternatively 0.1% to 5%, based on combined weights of all starting materials used in step 1) of the method. When present, all or a portion of starting material C) may be added in step 1). Alternatively, a first portion of starting material C) may be added in step 1) and a second portion of starting material C) may be added in an additional step added to the method before step 4). This additional step may be performed after step 2).

Step 2)

Step 2) may be performed using any convenient means, such as manually or using metering equipment. Step 2) may be performed at the temperature described above for step 1). Step 2) may be performed by adding a precatalyst under conditions permitting the precatalyst to react with one or more other starting materials or by-products to form D) the catalyst.

The precatalyst may be an acid that is solid at ambient conditions (e.g., RT and 101 kPa) and meltable at the reaction conditions (e.g., temperature and pressure employed in step 3) of the method described herein) and is capable of being removed at the conditions selected in step 4) (e.g., capable of solidifying upon cooling). For example, the precatalyst may be D1) a carboxylic acid. The carboxylic acid precatalyst may have a pKa value of 1 to 7. The carboxylic acid may have a melting temperature of 40° C. to 170° C. at 101 kPa. The carboxylic acid may be an aromatic carboxylic acid. Suitable carboxylic acids include D2) benzoic acid, D3) citric acid, D4) maleic acid, D5) myristic acid, D6) salicylic acid, and D7) a combination of two or more of D2), D3), D4), D5), and D6). Alternatively, the carboxylic acid may be selected from the group consisting of D2)

benzoic acid, D3) citric acid, D5) myristic acid, D6) salicyclic acid, and a combination of two or more of D2), D3), D5) and D6). Alternatively, the carboxylic acid may comprise benzoic acid. The amount of the carboxylic acid added in step 2) of the method described herein is 0.01% to 5%, based on combined weights of all starting materials used in the method. Without wishing to be bound by theory, it is thought that when the carboxylic acid precatalyst is used in the method described herein, this precatalyst will melt and react with B) the aminoalkyl-functional alkoxysilane to form a carboxylate salt, which acts as D) the catalyst for reaction of the starting materials to form the amino-functional polydiorganosiloxane.

Alternatively, the precatalyst may comprise D8) an acid anhydride. Without wishing to be bound by theory, it is thought that when the acid anhydride is used as the precatalyst, the acid anhydride will react with water to form a carboxylic acid, which will then react with starting material B) to form a carboxylate salt, which then acts as the catalyst. Without wishing to be bound by theory, it is thought that the acid anhydride may be reacted with water to form the carboxylic acid to avoid having the acid anhydride reacting with the amine functional group of starting material B) to form an amide, which would be less reactive. The acid anhydride may be solid at ambient conditions (e.g., RT and 101 kPa). The acid anhydride may be 9) maleic anhydride, D10) succinic anhydride, or D11) both D9) and D10). The acid anhydride may be reacted with water (to convert the acid anhydride to the carboxylic acid) by any convenient means. For example, the acid anhydride may be combined with water before adding the resulting combination to the starting materials in the method (e.g., in step 2). Alternatively, the acid anhydride may be combined with starting material A) before adding starting material B) in the method described herein, when starting material A) contains sufficient water (as a by-product) to react with the acid anhydride. Alternatively, when the acid anhydride is used in the method, the method may further comprise adding water before or during step 3).

Alternatively, the precatalyst may comprise both D1) the carboxylic acid and D8) the acid anhydride. For example, D1) the carboxylic acid described above may be used in the method first, such as to initiate the reaction, and thereafter (after water has formed as a by-product), D8) the acid anhydride may be added to the reaction mixture (e.g., during step 3) to react with the by-product water. One skilled in the art would recognize that combining the acid anhydride and the amine without sufficient water could result in formation of an amide, which is less reactive, and therefore, this condition may be avoided in practicing the method.

The inventors surprisingly found that amino-functional polydiorganosiloxanes made via previously disclosed processes contain sufficient acid content such that the amino-functional polydiorganosiloxanes have insufficient stability for some applications. It is thought that, even small amounts, i.e., on the order of 500 ppm, or more, of residual acid can detrimentally impact properties of the amino-functional polydiorganosiloxane. Residual acid refers to the carboxylic acid, the acid anhydride, when present, and the carboxylate, as described above.

Without wishing to be bound by theory, it is thought that more residual acid would contribute to poor stability and removing sufficient residual acid in the present method provides certain unexpected benefits. Without wishing to be bound by theory, it is thought that residual acid content <500 ppm will produce a more stable amino-functional polydiorganosiloxane than amino-functional polydiorganosiloxanes with >500 ppm residual acid, and residual acid content <300 ppm will produce an amino-functional polydiorganosiloxane having <0.1% cyclic polydiorganosiloxanes such as D4 (after aging for 6 months at 45° C.).

For example, in the EXAMPLES herein, the inventors surprisingly found that removing the residual acid such that residual acid content is <500 ppm, from the reaction product can improve stability of the amino-functional polydiorganosiloxane. Stability may be measured by viscosity, molecular weight, or degree of polymerization remaining stable (without significant change) over time, such as aging at 25° C. to 45° C. for 1 to 6 months (as measured according to the test method in the Reference Examples herein). Without wishing to be bound by theory, it is thought that reducing residual acid content to <300 ppm, based on the weight of the amino-functional polydiorganosiloxane provides the additional benefit of a product that contains less than 0.1% cyclic polydiorganosiloxanes, such as D4 and/or D5, based on the weight of the amino-functional polydiorganosiloxane. In this method, residual acid content after step 4) is <500 ppm, alternatively <300 ppm, based on the weight of amino-functional polydiorganosiloxane under practical process conditions (e.g., temperature and pressure) that allow sufficient amounts of residual acid to precipitate from the reaction mixture in a reasonable amount of time (e.g., 0 to 24 hours).

All, or a portion, of starting material D) may be added in step 2). Alternatively, a first portion of starting material D) may be added in step 2) and a second portion of starting material D) may be added in a later additional step. The later additional step is added before step 3). The later additional step may be after step 2) and before step 3). Without wishing to be bound by theory, the method described herein may provide the benefit of being solventless. Starting materials A), B), and D), and optionally C) can be combined neat, without emulsification in water or without the presence of a solvent.

Step 3) is performed at conditions sufficient to melt the carboxylic acid. Step 3) may be performed by any convenient means such as heating the reaction mixture at a temperature of at least 90° C. for at least one hour, alternatively at least 2 hours. Step 3) may include reducing pressure from 101 kPa to a pressure <100 mmHg for at least 1 hour, alternatively at least 2 hours. Alternatively, step 3) may be performed by heating the reaction mixture at a temperature of 100° C. to 150° C., alternatively 90° C. to 120° C., at a pressure of 0 to <100 mmHg for 1 to 10 hours, alternatively 2 to 8 hours, and alternatively 2 to 4 hours. The carboxylic acid may be soluble in water, which may be generated as a reaction by-product during step 3), and which may facilitate catalysis. Alternatively, when an acid anhydride is used, the acid anhydride may react with the water generated as a reaction by-product.

Step 4) of the method described herein may be performed by any convenient means sufficient to reduce the amount of residual acid in the reaction product to 0 to <500 ppm, alternatively 0 to <300 ppm, based on the weight of the amino-functional polydiorganosiloxane, as described above. Step 4) may comprise cooling the reaction product produced in step 3) to precipitate residual acid. Step 4) may comprise cooling to any temperature less than the temperature for reaction in step 3). Alternatively, step 4) may be performed by cooling the reaction product to 0° C. to 25° C., alternatively 0° C. to 4° C., and alternatively 4° C. to 25° C. Step 4) may further comprise filtration, centrifugation, or both.

The starting materials used in the method described above may be free of organic alcohols such as aliphatic alcohols having 8 to 30 carbon atoms, ether alcohols, and hydroxy-terminated polyethers. "Free of organic alcohols" means that the starting materials contain no organic alcohol or an amount of organic alcohol that is non-detectable by GC. Without wishing to be bound by theory, it is thought that presence of an organic alcohol may contribute to haziness (e.g., reduced transmittance as measured by the technique in the Reference Examples) of amino-functional polydiorganosiloxanes produced by the method described above.

Amino-Functional Polydiorganosiloxane

The amino-functional polydiorganosiloxane produced as described herein comprises unit formula (VII): $(R^1_3SiO_{1/2})_a (R^1_2SiO_{2/2})_b (R^8R^1SiO_{2/2})_c (R^8R^1_2SiO_{1/2})_d$, where $R^1$ and subscripts a, b, c, and d are as described above, and at least one $R^8$ per molecule is a group of formula (VIII):

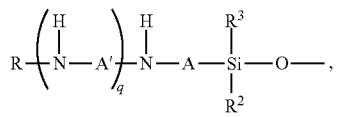

where R, $R^2$, $R^3$, A, A' and subscript q are as described above. Alternatively, 80% to 100% of all groups $R^8$ have formula (VIII). Without wishing to be bound by theory, when the endblocker C) is not used, all or substantially all of groups $R^8$ have formula (VIII). Alternatively, one or more of groups $R^8$ may have a formula derived from the endblocker, when it is used. For example, when a monoalkoxysilane of formula (V) is used as endblocker, some of groups $R^8$ may have formula $R^4_3SiO$—, where $R^4$ is as described above. And, when a silazane of formula (VI) is used as endblocker, some of $R^8$ may have formula $R^6R^7_2SiO$—, where $R^6$ and $R^7$ are as described above.

The amino-functional polydiorganosiloxane produced as described herein may have a transmittance of at least 95%, alternatively 99% to 100%, as measured by the technique described in the Reference Examples, below. The amino-functional polydiorganosiloxane produced as described herein may have a cyclic polydiorganosiloxane content of 0 to <0.1%. The amino-functional polydiorganosiloxane produced as described herein may be stable after aging for 1 to 6 months at RT, as shown in that viscosity of the amino-functional polydiorganosiloxane changes by 0 to 12% as measured by the technique in the Reference Examples below.

The amino-functional polydiorganosiloxane produced as described herein can be used in organic solvent solution or in aqueous solution or suspension. Compositions containing the amino-functional polysiloxane can contain additional ingredients such as surfactants, thickeners, rheology modifying additives, perfumes, waxes, emollients, cleaning agents, lubricating oils, electrolytes, biocides, and cosmetic materials.

The amino-functional polydiorganosiloxane can be chemically modified by reaction after it has been formed. Such modifications are known, for example, in preparing textile treatment agents. It can, for example, be reacted with a lactone, particularly a lactone of an omega-hydroxy carboxylic acid having 3 to 8 ring carbon atoms such as epsilon-caprolactone or gamma-butyrolactone, under the conditions described in U.S. Pat. No. 5,824,814, to form a polymer having hydroxyamide groups of the formula —N—C(O)—$(CH_2)_x$—OH, where subscript x is 2 to 7. The amino-functional polydiorganosiloxane can be reacted with an epoxide to form a polymer containing beta-hydroxyamine groups, for example with ethylene oxide to form —NH—$CH_2CH_2OH$ groups as described in U.S. Pat. No. 5,352,817 or with glycidol to form —NH—$CH(CH_2OH)_2$ groups. Alternatively, the amino-functional polydiorganosiloxane can be reacted with an acrylate or other activated C=C bond in a Michael-type addition, for example with hydroxyethyl acrylate to form —NH—$CH_2$—$CH_2$—COO—$C_2H_4OH$ groups. The amino-functional polydiorganosiloxane can be quaternized by reaction with an alkylating agent such as dimethyl sulphate as described in U.S. Pat. No. 5,164,522.

EXAMPLES

Some embodiments of the invention will now be described in detail in the following Examples. The following starting materials are used in these examples: A1) silanol end-blocked PDMS with a viscosity of 70 cP, A2) silanol end-blocked PDMS with a viscosity of 30 cP, B2) 3-aminopropylmethyl diethoxysilane, B3) aminoethyl-aminoisobutyl methyl dimethoxy silane, B5) 3-aminopropyldimethyl ethoxysilane, C6) HMDZ, and C4) trimethylmethoxysilane.

TABLE 1

Solid Carboxylic Acid and Acid Anhydride Precatalysts

| Starting Material D) | Melting Point (° C.) at 101 kPa | pKa |
|---|---|---|
| D3) Citric acid | 153 | 3.13 |
| D5) Myristic acid | 54.4 | 4.95 |
| D2) Benzoic acid | 122 | 4.2 |
| D10) Succinic anhydride | 120 | |
| D9) Maleic anhydride | 52.8 | |
| D4) Maleic acid | 135 | 1.9; 6.07* |
| D6) Salicylic acid | 158.6 | 2.97; 5.6* |

*Diacids can have two pKa values.

In this example 1, a 0.1% N amino-functional polydimethylsiloxane was synthesized using benzoic acid, as follows. To a reactor, the following starting materials (with amounts shown in weight parts) were charged: A1) silanol end-blocked PDMS with a viscosity of 70 cP (245), 3-aminopropylmethyl diethoxysilane (3.5), and C6) HMDZ (0.5). The solution mixture was heated to 90° C. for 10 min under a $N_2$ sweep. After 10 min, D2) benzoic acid (0.9) was added, and the resulting mixture was stirred at 90° C. for 2 hr. At this stage, the white benzoic acid was still visible in the reaction mixture. The distillation vacuum was then applied at the pressure <20 mmHg for 120 min to drive the reaction forward as indicated by an increase in viscosity over time. At this stage, the white benzoic acid was no longer evident upon visual inspection of the reaction mixture. The reaction was quenched with HMDZ (1.3), and stirring continued at 90° C. for 1.5 hr. The resulting sample progressively turned hazy upon the addition of HMDZ. Excess HMDZ was removed via distillation for 2 hr at 90° C. and pressure <20 mmHg. Upon cooling the sample to RT, fine residues were evident. The sample was subjected to a centrifugation at 3000-5000 rpm for 20-30 min, and the supernatant was carefully decanted. The resulting clear and colorless fluid was an amino-functional polydimethylsiloxane with trimethyl end cap. The polymer had a viscosity of 2000-3000 cP, amine content of 0.1%, and a transmittance of 100% with reference to water. The amount of benzoic acid in amino-functional polydimethylsiloxane with trimethyl end cap was <1 ppm as detected by ion chromatography. This amino-functional polydimethylsiloxane was stable for 2 years after aging at RT. No ammonia odor was detected.

In this example 2, a 0.1% N amino-functional polydimethylsiloxane was synthesized using myristic acid, as follows. To a reactor, the following starting materials (in amounts shown in weight parts) were charged: A1) silanol end-blocked PDMS with a viscosity of 70 cP (245), B2) 3-aminopropylmethyl diethoxysilane (3.5), and C6) HMDZ (1). The resulting mixture was heated to 90° C. for 10 min under a $N_2$ sweep. After 10 min, D5) myristic acid (5) was added, and the resulting mixture continued to stir at 90° C. for 1 hr. The distillation vacuum was then applied at the pressure <20 mmHg for 120 min to drive the reaction forward as indicated by an increase in viscosity over time. The reaction was quenched with HMDZ (0.85) and continued stirring at 90° C. for 1.5 hr. Excess HMDZ was removed via distillation for 2 hours at a temperature of 90° C. and pressure <20 mmHg. Upon cooling the sample to RT, very fine residues were evident by visual inspection. The sample was subjected to a centrifugation at 3000-5000 rpm for 20-30 min, and the supernatant was carefully decanted. The resulting clear and colorless fluid was an amino-functional polydimethylsiloxane with trimethyl end cap. This amino-functional polydimethylsiloxane had a viscosity of 8000-10,000 cP, amine content of 0.1%, and a transmittance of 100% with reference to water. This amino-functional polydimethylsiloxane was stable for 2 years after aging at RT. No ammonia odor was detected.

In this example 3, 0.1% N amino-functional polydimethylsiloxane was synthesized using citric acid, as follows. To a reactor, the following starting materials (with amounts shown in weight parts) were charged: A1) silanol end-blocked PDMS with a viscosity of 70 cP (245), B2) 3-aminopropylmethyl diethoxysilane (3.5), and C6) HMDZ (1). The resulting mixture was heated to 90° C. for 10 min under a $N_2$ sweep. After 10 min, D3) citric acid (0.6) was added, and the resulting mixture continued to stir at 90° C. for 1 hr. The distillation vacuum was then applied at a temperature of 90° C. and pressure <20 mmHg for 30 min, and then the reaction temperature was increased to 100° C. for another 30 min. Additional citric acid (1.1) was then added to the reaction mixture, and distillation was continued at a temperature of 100° C. and pressure <20 mmHg for 4 hr. The reaction was quenched with HMDZ (2) and stirring continued g at 90° C. for 1.5 h. Excess HMDZ was removed via distillation for 2 hours at a temperature of 90° C. and pressure <20 mmHg. Upon cooling the sample to RT, very fine residues were evident. The sample was subjected to a centrifugation at 3000-5000 rpm for 20-30 min, and the supernatant was carefully decanted. The resulting clear and colorless fluid was an amino-functional polydimethylsiloxane with trimethyl end capping. This amino-functional polydimethylsiloxane had a viscosity of 2,500-4,000 cP, amine content of 0.1%, and a transmittance of 100% with reference to water. This an amino-functional polydimethylsiloxane was stable for 15 months after aging at RT. No ammonia odor was detected.

In this example 4, 0.1% N amino-functional polydimethylsiloxane was synthesized using maleic anhydride, as follows. To a reactor, the following starting materials (with amounts shown in weight parts) were charged: A1) silanol end-blocked PDMS with a viscosity of 70 cP (245) and B2) 3-aminopropylmethyl diethoxysilane (3.5). The resulting mixture was heated to 90° C. for 10 min under a $N_2$ sweep. After 10 min, D9) maleic anhydride (1.8 g) was added, and the resulting mixture continued to stir at 90° C. for 2 hr. The distillation vacuum was then applied at a temperature of 90° C. and a pressure of <20 mmHg for 1 hr. Deionized water (5.1) and additional maleic anhydride (0.7) were added, and the vacuum was applied for another 2 hr. C6) HMDZ (1.5) was added to quench the reaction at 90° C. for 1.5 hr. Upon cooling the sample to RT, precipitation was evident. The sample was subjected to a centrifugation at 3000-5000 rpm for 20-30 min, and the supernatant was carefully decanted. The resulting fluid was an amino-functional polydimethylsiloxane with trimethyl end capping. This amino-functional polydimethylsiloxane had a viscosity of 4,000-7,500 cP, and an amine content of 0.1%.

In this example 5, 0.1% N amino-functional polydimethylsiloxane was synthesized using succinic anhydride, as follows. To a reactor, the following starting materials (with amounts shown in weight parts) were charged: A1) silanol end-blocked PDMS with a viscosity of 70 cP (245) and B2) 3-aminopropylmethyl diethoxysilane (3.5). The resulting mixture was heated to 90° C. for 10 min under a $N_2$ sweep. After 10 min, D10) succinic anhydride (2) was added, and the resulting mixture continued to stir at 90° C. for 2 hr. The distillation vacuum was then applied at 90° C. and a pressure of <20 mmHg for 140 min to drive the reaction forward as indicated by an increase in viscosity over time. The reaction was quenched with C6) HMDZ (1.6) and continued stirring at 90° C. for 1.5 hr. Excess HMDZ was removed via distillation for 2 hr at 90° C. and a pressure <20 mmHg. Upon cooling the sample to RT, precipitation was evident. The sample was subjected to a centrifugation at 3000-5000 rpm for 20-30 min, and the supernatant was carefully decanted. The resulting clear and colorless fluid was an amino-functional polydimethylsiloxane with trimethyl end capping. This amino-functional polydimethylsiloxane had a viscosity of 6,000-7,500 cP, amine content of 0.1%, and a transmittance of 100% with reference to water. This amino-functional polydimethylsiloxane was stable for 15 months after aging at RT. No ammonia odor was detected.

In this example 6, 0.8% N diamino-functional polydimethylsiloxane was synthesized using benzoic acid, as follows. To a reactor, the following starting materials (with amounts shown in weight parts) were charged: A2) silanol end-blocked PDMS with a viscosity of 30 cP (92), B3) aminoethyl-aminoisobutyl methyl dimethoxy silane (3.9), and C6) hexamethyldisilazane (1). The resulting mixture was heated to 90° C. for 10 min under a $N_2$ sweep. After 10 min, D2) benzoic acid (0.5) was added, and the resulting mixture continued to stir at 90° C. for 2 hr. The distillation vacuum was then applied at pressure <20 mmHg for 120 min. The reaction was quenched with HMDZ (0.3) and continued to heat and stir at 90° C. for 1 hr. The reaction mixture was then cooled to RT and the resulting mixture was subjected to filtration. The resulting clear and slightly yellow fluid was a di-amino-functional polydimethylsiloxane with trimethyl end capping. This di-amino-functional polydimethylsiloxane had a viscosity of 2000-3000 cP, amine content of 0.8%, and a transmittance of 99% with reference to water. This di-amino-functional polydimethylsiloxane was stable after aging at room temperature for 3 months.

In this example 7, a 0.8% N diamino-functional polydimethylsiloxane was synthesized using benzoic acid, as follows. To reactor, the following starting materials (with amounts shown in weight parts) were charged: A2) silanol end-blocked PDMS with a viscosity of 30 cP (229), B3) aminoethyl-aminoisobutyl methyl dimethoxy silane (16.4), and C6) hexamethyldisilazane (3). The resulting mixture was heated to 90° C. for 10 min under a $N_2$ sweep. After 10 min, D2) benzoic acid (1) was added, and the resulting mixture continued to stir at 90° C. for 2 hr. The distillation vacuum was then applied at a pressure <20 mmHg for 240 min. The reaction was quenched with HMDZ (0.09), mixed for 30 minutes at 90° C. and then cooled to RT where the resulting fluid was subjected to filtration. The resulting clear and slightly yellow fluid was a di-amino-functional polydimethylsiloxane with trimethyl end capping. This di-amino-functional polydimethylsiloxane had a viscosity of 1500-3000 cP, amine content of 0.8%, and benzoic acid <300 ppm. This di-amino-functional polydimethylsiloxane was stable after aging at RT for 6 months. This example was repeated 3 times. The results are listed as samples 7a, 7b, and 7c in the tables below.

In this example 8, 0.8% N diamino-functional polydimethylsiloxane was synthesized using benzoic acid, as follows. To a reactor, the following starting materials (with amounts shown in weight parts) were charged: A2) silanol end-blocked PDMS with a viscosity of 30 cP (343), B3) aminoethyl-aminoisobutyl methyl dimethoxy silane (24.7), and C6) hexamethyldisilazane (4.5). The resulting mixture was heated to 90° C. for 10 min under a $N_2$ sweep. After 10 min, D2) benzoic acid (1.5) was added, and the resulting mixture continued to stir at 90° C. for 2 hr. The distillation vacuum was then applied at a pressure <20 mmHg for 300 min. The reaction mixture was then cooled to RT where the product was subjected to filtration. The resulting clear and slightly yellow fluid was a di-amino-functional polydimethylsiloxane with trimethyl end capping. This di-amino-functional polydimethylsiloxane had a viscosity of 1000-2000 cP, amine content of 0.8%, and benzoic acid content <300 ppm. This di-amino-functional polydimethylsiloxane was stable after aging at RT for 6 months. This example was repeated two times. The results are listed as Example 8a and Example 8b in the tables below.

In this example 9, a monoamine-functional polydimethyl siloxane was synthesized using salicylic acid, as follows. To a reactor, the following starting materials (with amounts shown in weight parts) were charged: A1) silanol end-blocked PDMS with a viscosity of 70 cP (245), A3) aminopropyl-methyl diethoxy silane (3.4). The resulting clear mixture was heated to 90° C. for 10 min under a $N_2$ sweep. After 10 min, D6) salicylic acid (1.3) was added as a white solid, and the hazy solution mixture was continued to stir at 90° C. for 2 hr. The distillation vacuum was then applied at a pressure <20 mmHg for 120 min and temperature was raised to 100° C. The reaction was quenched with C6) HMDZ (2), mixed for 70 min at 100° C. and then cooled to RT where the resulting fluid was subjected to filtration.

In this example 10, a monoamine-functional polydimethyl siloxane was synthesized using Maleic acid, as follows. To a reactor, the following starting materials (with amounts shown in weight parts) were charged: A1) silanol end-blocked PDMS with a viscosity of 70 cP (246), B2) aminopropyl-methyl diethoxy silane (3.5) and C6) HMDZ (2). The resulting clear mixture was heated to 90° C. for 10 min under a $N_2$ sweep. After 10 min, D9) maleic acid (2.1) was added as a white solid, and the resulting hazy mixture continued to stir at 90° C. for 2 hr. The distillation vacuum was then applied at the pressure <20 mmHg for 90 min. The reaction was quenched with additional HMDZ (1.5), mixed for 60 min at 90° C. and then cooled to RT where the product was subjected to filtration.

In this example 11, a 0.1% N amino-functional polydimethylsiloxane was using benzoic acid, as follows. To a reactor, the following starting materials (with amounts shown in weight parts) were charged: A1) silanol end-blocked PDMS with a viscosity of 70 cP (245), B2) 3-aminopropylmethyl diethoxysilane (3.5), and C6) (0.5). The resulting mixture was heated to 90° C. for 10 min under a $N_2$ sweep. After 10 min, D2) benzoic acid (0.9) was added, and the resulting mixture continued to stir at 90° C. for 2 hr. At this stage, the white benzoic acid was still visible in the reactor. The distillation vacuum was then applied at the pressure <20 mmHg for 135 min to drive the reaction forward as indicated by an increase in viscosity over time. At this stage, the white benzoic acid was no longer evident. The reaction was quenched with additional HMDZ (1.3) and stirring continued at 90° C. for 1.5 hr. The sample progressively turned hazy upon the addition of HMDZ. Excess HMDZ was removed via distillation for 2 hr at 90° C. a pressure <20 mmHg. Upon cooling the sample to RT, fine residues were evident. The sample was subjected to a centrifugation at 7000 rpm for 15-20 min, and the supernatant was carefully decanted. The resulting clear and colorless fluid was an amino-functional polydimethylsiloxane with trimethyl end capping. This amino-functional polydimethylsiloxane had a viscosity of 2000-3000 cP, amine content of 0.1%, and a transmittance of 100% with reference to water. The amount of benzoic acid in this amino-functional polydimethylsiloxane was <1 ppm as detected by ion chromatography. This amino-functional polydimethylsiloxane was stable for 2 years after aging at RT. No ammonia odor was detected.

In this example 12, a 0.1% N amino-functional polydimethylsiloxane was synthesized using benzoic acid, as follows. To a reactor, the following starting materials (with amounts shown in weight parts) were charged: A1) silanol end-blocked PDMS with a viscosity of 70 cP (245), B2) 3-aminopropylmethyl diethoxysilane (3.5), and 06) HMDZ (0.5). The resulting mixture was heated to 90° C. for 10 min under a $N_2$ sweep. After 10 min, D2) benzoic acid (0.9) was added, and the resulting mixture continued to stir at 90° C. for 2 hr. At this stage, the white benzoic acid was still visible in the reactor. The distillation vacuum was then applied at the pressure <20 mmHg for 150 min to drive the reaction forward as indicated by an increase in viscosity over time. At this stage, the white benzoic acid was no longer evident. The reaction was quenched with additional HMDZ (1.3) and stirring continued at 90° C. for 1.5 hr. The sample progressively turned hazy upon the addition of HMDZ. Excess HMDZ was removed via distillation for 2 hr at a temperature of 90° C. and a pressure <20 mmHg. Upon cooling the sample to RT, fine residues were evident. The sample was subjected to a centrifugation at 7000 rpm for 15-20 min, and the supernatant was carefully decanted. The resulting clear and colorless fluid was an amino-functional polydimethylsiloxane with trimethyl end capping. This amino-functional polydimethylsiloxane had a viscosity of 2000-3000 cP, amine content of 0.1%, and a transmittance of 100% with reference to water. The amount of residual benzoic acid in this amino-functional polydimethylsiloxane was <1 ppm as detected by ion chromatography. This amino-functional polydimethylsiloxane was stable for 2 years after aging at RT. No ammonia odor was detected.

In this example 13, 0.8% N diamino-functional polydimethylsiloxane was synthesized using benzoic acid, as follows. To a reactor, the following starting materials (in amounts shown in weight parts) were charged: A2) silanol end-blocked PDMS with a viscosity of 30 cP (343), B3) aminoethyl-aminoisobutyl methyl dimethoxy silane (24.7), and C6) HMDZ (4.5). The resulting mixture was heated to 90° C. for 10 min under a $N_2$ sweep. After 10 min, D2) benzoic acid (1.50 g) was added, and the resulting mixture continued to stir at 90° C. for 2 hr. The distillation vacuum was then applied at a pressure <20 mmHg for 180 min. The resulting mixture was cooled down to RT and subjected to filtration. The resulting clear and slightly yellow fluid was a di-amino-functional polydimethylsiloxane with trimethyl end capping. This di-amino-functional polydimethylsiloxane had a viscosity of 8000-10,000 cP, amine content of 0.8%, and residual benzoic acid <300 ppm. This di-amino-functional polydimethylsiloxane was stable after aging at room temperature for 6 months.

In this example 14, 0.1% N amino-functional polydimethylsiloxane copolymer was synthesized using benzoic acid, as follows. To a reactor, the following starting materials (in amounts shown in weight parts) were charged: A1) a silanol end-blocked PDMS with a viscosity of 70 cP (123), B2) 3-aminopropylmethyl diethoxysilane (1.7), and C6) HMDZ (0.3). The resulting mixture was heated to 90° C. for 10 min under a $N_2$ sweep. After 10 min, D2) benzoic acid (0.6) was added, and the resulting mixture continued to stir at 90° C. for 2 hr. At this stage, the white benzoic acid was still visible in the reactor. The distillation vacuum was then applied at a pressure of <20 mmHg for 120 min to drive the reaction forward as indicated by an increase in viscosity over time. At this stage, the white benzoic acid was no longer evident. The reaction was quenched with additional HMDZ (0.5) and stirring continued at 90° C. for 1 hr. Upon cooling the sample to RT, fine residues were evident. The sample was subjected to filtration to remove residual benzoic acid. The resulting clear and colorless fluid was an amino-functional polydimethylsiloxane with trimethyl end capping. This amino-functional polydimethylsiloxane had a viscosity of 6000-7500 cP, amine content of 0.1%, and a transmittance of 100% with reference to water. This amino-functional polydimethylsiloxane was stable for 2 months after aging at RT. No ammonia odor was detected.

In this example 15, 0.1% N amino-functional polydimethylsiloxane was synthesized using benzoic acid, as follows. To a reactor, the following starting materials (in amounts shown in weight parts) were charged: A1) a silanol end-blocked PDMS with a viscosity of 70 cP (122.5 g), B2) 3-aminopropylmethyl diethoxysilane (1.7), and C6) HMDZ (0.5). The resulting mixture was heated to 90° C. for 10 min under a $N_2$ sweep. After 10 min, D2) benzoic acid (0.6) was added, and the resulting mixture continued to stir at 90° C. for 2 hr. At this stage, the white benzoic acid was still visible in the reactor. The distillation vacuum was then applied at a pressure <20 mmHg for 120 min to drive the reaction forward as indicated by an increase in viscosity over time. At this stage, the white benzoic acid was no longer evident. The reaction was quenched with additional HMDZ (0.5) and continued stirring at 90° C. for 1 hr. Upon cooling the sample to RT, fine residues were evident. The sample was subjected to filtration to remove residual benzoic acid. The resulting clear and colorless fluid was an amino-functional polydimethylsiloxane with trimethyl end capping. This an amino-functional polydimethylsiloxane had a viscosity of 2000-3000 cP, amine content of 0.1%, and a transmittance of 100% with reference to water. This an amino-functional polydimethylsiloxane was stable for 2 months after aging at RT. No ammonia odor was detected.

Stability of the aminopropyl functional polydimethylsiloxanes prepared as described above was evaluated as described in the Reference Examples. The stability referred to viscosity and cyclic content. A minimal viscosity drift was observed after aging the samples for 2 years at RT, as shown in Table 2, below. The cyclic content for aminopropyl functional polydimethylsiloxane was <0.1% after 2 yrs aging at RT as shown in Table 3, below.

TABLE 2

Viscosity stability of the aminopropylsiloxane polymers prepared by using Benzoic acid as a catalyst

| Example | | N mol % | Viscosity at RT (cP) 0 | Viscosity at RT (cP) 2 yrs | Change in Viscosity (%) (Viscosity after 2 yrs)/(Initial Viscosity) × 100 |
|---|---|---|---|---|---|
| 24251-26 | Example 1 | 0.5 | 2500 | 2783 | 11 |
| 24251-28 | Example 11 | 0.5 | 2310 | 2300 | 4 |
| 24251-33 | Example 12 | 0.5 | 2556 | 2565 | 4 |

TABLE 3

Cyclic stability of the aminosiloxane polymer prepared using benzoic acid as a catalyst.

| | D4 (%) | | D5 (%) | |
|---|---|---|---|---|
| monoamine | 2 months, 45° C. | 2 yrs, RT | 2 months, 45° C. | 2 yrs, RT |
| Example 1 | 0.017 | 0.048 | 0.014 | 0.049 |
| Example 11 | 0.021 | 0.034 | 0.012 | 0.070 |
| Example 12 | N/A | 0.062 | N/A | 0.068 |
| diamine | 0 | 1 month, 45° C. | 0 | 1 month, 45° C. |
| Example 6 | N/A | 0.033 | N/A | 0.065 |
| Example 8a | 0.017 | 0.038 | 0.039 | 0.086 |
| Example 8b | 0.015 | 0.03 | 0.037 | 0.089 |
| Example 13 | 0.024 | 0.039 | 0.048 | 0.094 |

The amount of benzoic acid used to catalyze the reaction was 3000 ppm to 6000 ppm. The results below in Table 4 show the concentration of residual acid in the amino-functional polydimethylsiloxanes produced as described above after filtration.

TABLE 4

Benzoic acid analysis of the amino-functional polydimethylsiloxanes prepared as described above

| Example | benzoic acid (ppm) |
|---|---|
| 1 | <1 |
| 11 | <1 |
| 12 | <1 |
| 6 | 270 |
| 8a | 24 |
| 8b | 55 |
| 14 | <1 |
| 15 | 357 |
| 7a | 116 |
| 7b | 1 |
| 7c | 24 |

Reference Examples—Test Methods

Viscosity of amino-functional polydimethylsiloxanes prepared in the examples described above was measured at RT with a Brookfield DV-III Ultra (CPE-52 spindle)). Results were reported in cP.

Amine content of the amino-functional polydimethylsiloxanes prepared in the examples described above was measured at RT via amine titration.

Transmittance of the amino-functional polydimethylsiloxanes prepared in the examples described above was measured with reference to water using a Spectronic 21: Milton Roy.

Ammonia odor was tested using a Hydrion® paper strip. The test was performed after the samples were aged.

Mn was measured using a conventional Gel Permeation Chromatography (GPC), based on polystyrene standards analyzed in THF. The samples were analyzed in THF (30 mg of sample in 5 mL of solvent), capped with acetic anhydride, filtered with a 0.45 micrometer PTFE syringe filtered, and analyzed against polystyrene standards. The chromatographic apparatus was a of a Waters 2695 Separations Module equipped with a vacuum degasser, a Waters 2410 differential refractometer and two (300 mm×7.5 mm) Polymer Laboratories Mixed C columns (molecular weight separation range of 200 to 3,000,000) preceded by a guard column. The separation was performed using certified grade THF programmed to flow at 1.0 mL/min, injection volume was set at 100 microliters and columns and detector were heated to 35° C. Data collection was 25 min and processing was performed using Atlas/Cirrus software.

Acid analysis was performed using ion chromatography. Samples were prepared by treating 2 g of sample with 10 mL of methylene chloride and extracting with 10 mL of deionized water by shaking at room temperature for 1 hour. The extraction mixtures were centrifuged to aid in phase separation, filtered the aqueous phase through 0.45 um nylon syringe filters, diluted the filtered aqueous phase 100× with deionized water, shaken by hand to disperse, and analyzed by ion chromatography with conductivity detection. Anion analyses were performed on an ion chromatograph equipped with a 2 mm×250 mm AS11 column, a 25 microliter sample loop and a conductivity detector. Isocratic 25 mM KOH was the eluent. Flow=0.35 mL/min, oven=30C, suppressor=ASRS 300 recycle mode, current=50 mA, DX-500.

Filtration of samples was performed as follows. Samples were filtered through 20 micron nylon filter membranes at room temperature with nitrogen at 35-40 psi, and assisted by 0.5-1.0 inches Celite Filtration aid. The receiving vessel was nitrogen purged.

INDUSTRIAL APPLICABILITY

The amino-functional polydiorganosiloxanes prepared by the method described herein are useful in hair care and textile treatment applications. Without wishing to be bound by theory it is thought that use of the method described herein will provide one or more benefits to the amino-functional polydiorganosiloxane, such as: i) reduced yellowing with time, ii) reduced amine odor with time, iii) reduced viscosity drift with time, iv) less generation of cyclic siloxanes (such as D4 and/or D5) with time and v) high transmittance (e.g., 95% to 100%, alternatively 99% to 100% as measured according to the Reference Examples above); as compared to amino-functional polydiorganosiloxanes produced by previous methods in which the order of addition of starting materials differs, and the residual acid content is not reduced to <500 ppm.

Definitions and Usage of Terms:

The abbreviations used in this application have the meanings set forth in Table X.

TABLE X

| Abbreviation | Definition |
| --- | --- |
| ° C. | degrees Celsius |
| cP | centipoise |
| D4 | octamethylcyclotetrasiloxane |
| D5 | decamethylcyclopentasiloxane |
| DP | degree of polymerization |
| g | grams |
| GC | gas chromatography |
| GPC | gel permeation chromatography |
| HMDZ | hexamethyldisilazane |
| hr | hours |
| kPa | kiloPascals |
| min | minutes |
| mL | milliliters |
| mm | millimeter |
| mM | millimolar |
| Mn | number average molecular weight |
| $N_2$ | nitrogen |
| PDMS | polydimethylsiloxane |
| ppm | parts per million |
| PTFE | polytetrafluoroethylene |
| rpm | revolutions per minute |
| RT | room temperature of 20° C. to 25° C. |
| THF | tetrahydrofuran |
| yrs | years |

All amounts, ratios, and percentages are by weight unless otherwise indicated by the context of the specification. The amounts of all starting materials in a composition, or used in a method, total 100% by weight. The SUMMARY and ABSTRACT are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 1 to 12 includes not only the range of 1 to 12 including endpoints, but also 1, 2, 3, 4, 6, 10, and 12 individually, as well as any other number subsumed in the range. Furthermore, disclosure of a range of, for example, 1 to 12 includes the subsets of, for example, 1 to 3, 2 to 6, 10 to 12, and 2 to 6, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup hydrogen, alkyl and aryl; the subgroup hydrogen and alkyl; and any other individual member and subgroup subsumed therein.

"Alkyl" means a branched or unbranched, saturated monovalent hydrocarbon group. Examples of alkyl groups include methyl, ethyl, propyl (including n-propyl and/or iso-propyl), butyl (including iso-butyl, n-butyl, tert-butyl, and/or sec-butyl), pentyl (including, iso-pentyl, neopentyl, and/or tert-pentyl); and hexyl, heptyl, octyl, nonyl, and decyl, as well as branched saturated monovalent hydrocarbon groups of 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Aralkyl" and "alkaryl" each refer to an alkyl group having a pendant and/or terminal aryl group or an aryl group having a pendant alkyl group. Exemplary aralkyl groups include benzyl, tolyl, xylyl, phenylethyl, phenyl propyl, and phenyl butyl. Aralkyl groups have at least 7 carbon atoms. Monocyclic aralkyl groups may have 7 to 12 carbon atoms, alternatively 7 to 9 carbon atoms, and alternatively 7 to 8 carbon atoms. Polycyclic aralkyl groups may have 7 to 17 carbon atoms, alternatively 7 to 14 carbon atoms, and alternatively 9 to 10 carbon atoms.

"Alkenyl" means a branched, or unbranched monovalent hydrocarbon group, where the monovalent hydrocarbon group has a double bond. Alkenyl groups include vinyl, allyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means a branched, or unbranched monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom. Aryl is exemplified by, but not limited to, phenyl and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene or cyclohexene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

"Divalent hydrocarbon group" means a divalent group made up of hydrogen and carbon atoms. Divalent hydrocarbon group includes alkylene groups such as ethylene, propylene (including isopropylene and n-propylene), and butylene (including n-butylene, t-butylene and isobutylene); and pentylene, hexylene, heptylene, octylene, and branched and linear isomers thereof; arylene groups such as phenylene, e.g., ortho-phenylene; and alkaralkylene groups such as:

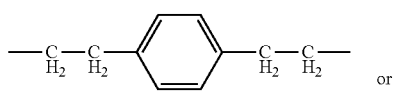

or

-continued

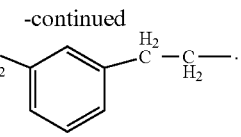

Alternatively, each divalent hydrocarbon group may be ethylene, propylene, butylene or hexylene. Alternatively, each divalent hydrocarbon group may be ethylene or propylene.

"Halogenated hydrocarbon group" means a hydrocarbon where one or more hydrogen atoms bonded to a carbon atom have been formally replaced with a halogen atom. Monovalent halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl groups such as chloromethyl, 3-chloropropyl 2,2-dichlorocyclopropyl, 2,3-dichlorocyclopentyl. Haloalkenyl groups include chloroallyl.

"Monovalent hydrocarbon group" means a monovalent group made up of hydrogen and carbon atoms. Monovalent hydrocarbon groups include, alkyl, aralkyl, alkenyl, alkynyl, aryl, and carbocyclic groups such as cycloalkyl groups, as described above.

The term "comprise" or derivatives thereof such as "comprising" or "comprises" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to."

On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Embodiments of the Invention

1. A method for preparing an amino-functional polydiorganosiloxane comprises:

1) mixing and heating, at a temperature of 50° C. to 160° C., starting materials comprising
   A) a silanol functional polydiorganosiloxane,
   B) an aminoalkyl-functional alkoxysilane,
   where amounts of starting materials A) and B) are such that a molar excess of silanol groups with respect to alkoxy groups is present, and
   C) 0 to 0.5%, based on combined weights of all starting materials, of an endblocker having triorganosilyl groups; and thereafter
2) providing starting material D) 0.01% to 5%, based on weight of starting material B), of a solid carboxylic acid, thereby forming a reaction mixture;
3) mixing and heating the reaction mixture under conditions to form the reaction product;
4) removing all or a portion of residual acid, thereby reducing amount of the residual acid to 0 to <500 ppm, based on the weight of the amino-functional polydiorganosiloxane.

2. A method for preparing an amino-functional polydiorganosiloxane comprises:
1) mixing and heating, at a temperature of 50° C. to 160° C., starting materials comprising
   A) a silanol functional polydiorganosiloxane,
   B) an aminoalkyl-functional alkoxysilane,
   where amounts of starting materials A) and B) are such that a molar excess of silanol groups with respect to alkoxy groups is present, and
   C) 0 to 0.5%, based on combined weights of all starting materials, of an endblocker having triorganosilyl groups; and thereafter
2) providing starting material D) 0.01% to 5%, based on weight of starting material B), of an acid anhydride, thereby forming a reaction mixture, with the proviso that
   E) water is present in addition to the acid anhydride;
3) mixing and heating the reaction mixture under conditions to form the reaction product;
4) removing all or a portion of residual acid, thereby reducing amount of the residual acid to 0 to <500 ppm, based on the weight of the amino-functional polydiorganosiloxane.

3. The method of embodiment 2, where the water is added as a starting material.

4. The method of embodiment 2, where the water is present as a by-product in starting material A).

5. A method for preparing an amino-functional polydiorganosiloxane comprises:
I) mixing and heating, at a temperature of 50° C. to 160° C., starting materials comprising
   A) a silanol functional polydiorganosiloxane,
   D) an acid anhydride, and
   E) water, and thereafter
II) adding starting material B) an aminoalkyl-functional alkoxysilane,
   where amounts of starting materials A) and B) are such that a molar excess of silanol groups with respect to alkoxy groups is present, and
   and optionally adding starting material C) 0 to 0.5%, based on combined weights of all starting materials, of an endblocker having triorganosilyl groups,
   thereby forming a reaction mixture;
3) mixing and heating the reaction mixture under conditions to form the reaction product;
4) removing all or a portion of residual acid, thereby reducing amount of the residual acid to 0 to <500 ppm, based on the weight of the amino-functional polydiorganosiloxane.

6. A method for preparing an amino-functional polydiorganosiloxane comprises:
1) mixing and heating, at a temperature of 50° C. to 160° C., starting materials comprising
   A) a silanol functional polydiorganosiloxane,
   B) an aminoalkyl-functional alkoxysilane,
   where amounts of starting materials A) and B) are such that a molar excess of silanol groups with respect to alkoxy groups is present,
   C) 0 to 0.5%, based on combined weights of all starting materials, of an endblocker having triorganosilyl groups, and
   starting material D) 0.01% to 5%, based on weight of starting material B), of a solid carboxylic acid, thereby forming a reaction mixture;
2) mixing and heating the reaction mixture under conditions to form the reaction product and water as a by-product; and thereafter
3) adding an acid anhydride; and
4) removing all or a portion of residual acid, thereby reducing amount of the residual acid to 0 to <500 ppm, based on the weight of the amino-functional polydiorganosiloxane.

7. The method of any one of the preceding embodiments, where in step 4) the amount of the residual acid is reduced to 0 to <300 ppm, based on the weight of the amino-functional polydiorganosiloxane.

8. The method of any one of the preceding embodiments, where starting material A) is selected from the group consisting of
A1) a silanol end-blocked polydimethylsiloxane with a viscosity of 30 cP to 70 cP, and
A2) a silanol end-blocked polydimethylsiloxane with a degree of polymerization of 4 to 1000.

9. The method of any one of the preceding embodiments, where starting material B) is selected from the group consisting of:
B1) 3-aminopropylmethyl dimethoxysilane,
B2) 3-aminopropylmethyl diethoxysilane,
B3) aminoethyl-aminoisobutyl methyl dimethoxy silane,
B4) aminoethyl-aminoisobutyl methyl diethoxysilane
B5) 3-aminopropyldimethyl ethoxysilane,
B6) 3-aminopropyldimethyl methoxysilane,
B7) 3-(2-aminoethylamino)propyl-dimethoxymethylsilane,
B8) 3-(2-aminoethylamino)propyl-diethoxymethylsilane,
B9) aminopropyl methyl dimethoxy silane,
B10) aminopropyl methyl diethoxysilane, and
B11) a combination of two or more of B1) to B10).

10. The method of any one of the preceding embodiments, where starting material C) is present in an amount of at least 0.1% and starting material C) is selected from the group consisting of:
C1) hexamethyldisilazane,
C2) trimethylmethoxysilane,
C3) trimethylethoxysilane, and
C4) a combination of two or more of C1), C2) and C3).

11. The method of embodiment 1 or embodiment 6, where the solid carboxylic acid has a pKa value of 1 to 7 and a melting temperature of 40° C. to 170° C. at 101 kPa.

12. The method of embodiment 11, where the carboxylic acid is selected from the group consisting of: D2) benzoic acid, D3) citric acid, D4) maleic acid, D5) myristic acid, D6) salicylic acid, and D7) a combination of two or more of D2), D3), D4), D5), and D6).

13. The method of embodiment 1, 6, 10, 11, or 12, where the carboxylic acid is selected from the group consisting of:

D2) benzoic acid, D3) citric acid, D5) myristic acid, D6) salicylic acid, and D7) a combination of two or more of D2), D3), D5), and D6).

14. The method of any one of embodiments 2 to 5, where the solid acid anhydride is selected from the group consisting of: D7) succinic anhydride, D8) maleic anhydride, and both D8) and D9).

15. The method of any one of the preceding embodiments, where starting materials A) and B) are present in amounts such that a molar ratio of silanol groups to respect alkoxy groups is at least 1.1:1.

16. The method of embodiment 15, where the molar ratio ranges from 1.2:1 to 2.0:1.

17. The method of embodiment 1 or 6, where the catalyst is benzoic acid, and step 3) is performed by heating the reaction product at a temperature of at least 80° C. at a pressure <50 mmHg for at least 2 hours.

18. The method of any one of the preceding embodiments, where step 3) is performed by heating the reaction product at a temperature of 90° C. to 110° C. at a pressure of 0 to <50 mmHg for 2 to 8 hours.

19. The method of any one of the preceding embodiments, where step 4) comprises cooling the reaction product and thereafter filtering and/or centrifuging the reaction product.

20. The method of embodiment 19, where the reaction product is cooled to 0° C. to 25° C.

The invention claimed is:

1. A method for preparing an amino-functional polydiorganosiloxane comprising:
   1) mixing and heating, at a temperature of 50° C. to 160° C., starting materials comprising
      A) a silanol functional polydiorganosiloxane,
      B) an aminoalkyl-functional alkoxysilane, where amounts of starting materials A) and B) are such that a molar excess of silanol groups with respect to alkoxy groups is present, and
      C) 0 to 0.5%, based on combined weights of all starting materials, of an endblocker having triorganosilyl groups; and thereafter
   2) providing starting material D) 0.01% to 5%, based on weight of starting material B), of a solid (at conditions of 20° C. to 25° C. and 101 kPa) precatalyst selected from the group consisting of a carboxylic acid, an acid anhydride, and a combination of both the carboxylic acid and the acid anhydride under conditions permitting the precatalyst to react to form a catalyst; thereby forming a reaction mixture; and
   3) mixing and heating the reaction mixture under conditions to form a reaction product; and
   4) removing all or a portion of residual acid by a technique comprising cooling the reaction product, thereby reducing amount of the residual acid to 0 to <500 ppm, based on the weight of the amino-functional polydiorganosiloxane, where step 4) further comprises filtering and/or centrifuging the reaction product after cooling.

2. The method of claim 1, where in step 4) the amount of the residual acid is reduced to 0 to <300 ppm, based on the weight of the amino-functional polydiorganosiloxane.

3. The method of claim 1, where starting material A) is selected from the group consisting of
   A1) a silanol end-blocked polydimethylsiloxane with a viscosity of 30 cP to 70 cP at room temperature, and
   A2) a silanol end-blocked polydimethylsiloxane with a degree of polymerization of 4 to 1000.

4. The method of claim 1, where starting material B) is selected from the group consisting of:

B1) 3-aminopropylmethyl dimethoxysilane,
B2) 3-aminopropylmethyl diethoxysilane,
B3) aminoethyl-aminoisobutyl methyl dimethoxy silane,
B4) aminoethyl-aminoisobutyl methyl diethoxysilane
B5) 3-aminopropyldimethyl ethoxysilane,
B6) 3-aminopropyldimethyl methoxysilane,
B7) 3-(2-aminoethylamino)propyl-dimethoxymethylsilane,
B8) 3-(2-aminoethylamino)propyl-diethoxymethylsilane,
B9) aminopropyl methyl dimethoxy silane,
B10) aminopropyl methyl diethoxysilane, and
B11) a combination of two or more of B1) to B10).

5. The method of claim 1, where starting material C) is present in an amount of at least 0.1% and starting material C) is selected from the group consisting of:
   C1) hexamethyldisilazane,
   C2) trimethylmethoxysilane,
   C3) trimethylethoxysilane, and
   C4) a combination of two or more of C1), C2) and C3).

6. The method of claim 1, where the solid carboxylic acid has a pKa value of 1 to 7 and a melting temperature of 40° C. to 170° C. at 101 kPa.

7. The method of claim 6, where the carboxylic acid is selected from the group consisting of: D2) benzoic acid, D3) citric acid, D4) maleic acid, D5) myristic acid, D6) salicylic acid, and D7) a combination of two or more of D2), D3), D4), D5), and D6).

8. The method of claim 1, where the precatalyst comprises the acid anhydride, and the method further comprises combining the acid anhydride with water.

9. The method of claim 8, where the solid acid anhydride is selected from the group consisting of: D7) succinic anhydride, D8) maleic anhydride, and both D8) and D9).

10. The method of claim 8, where the water is present in-situ.

11. The method of claim 1, where: i) all or a portion of starting material C) is added in step 1), ii) all or a portion of starting material D) is added in step 2), or both i) and ii).

12. The method of claim 11, where: i) a portion of starting material C) is added in step 1), ii) a portion of starting material D) is added in step 2), or both i) and ii); and the method further comprises iii) adding a second portion of starting material C), iv) adding a second portion of starting material D), or both iii) and iv), in an additional step added to the method before step 4).

13. The method of claim 11, where all of starting material C) is added in step 1), and all of starting material D) is added in step 2).

14. The method of claim 1, where starting materials A) and B) are present in amounts such that a molar ratio of silanol groups to respect alkoxy groups is at least 1.1:1.

15. The method of claim 14, where the molar ratio ranges from 1.2:1 to 2.0:1.

16. The method of claim 1, where the catalyst is benzoic acid, and step 3) is performed by heating the reaction product at a temperature of at least 80° C. at a pressure <50 mmHg for at least 2 hours.

17. The method of claim 16, where step 3) is performed by heating the reaction product at a temperature of 90° C. to 110° C. at a pressure of 0 to <50 mmHg for 2 to 8 hours.

18. The method of claim 1, where water is present as a by-product in starting material A), and optionally the carboxylic acid is added in step 2), and the acid anhydride is added after the carboxylic acid has been added and after water has formed as a by-product.

* * * * *